United States Patent [19]
Drummond

[11] Patent Number: 5,726,444
[45] Date of Patent: Mar. 10, 1998

[54] ULTRASONIC DIRECTIONAL FIBER-OPTIC HYDROPHONE

[75] Inventor: James E. Drummond, P.O. Box 107, Lincoln City, Oreg. 97367-0107

[73] Assignees: James E. Drummond; Joy T. Drummond, both of Otis, Oreg.

[21] Appl. No.: 626,117

[22] Filed: Apr. 1, 1996

[51] Int. Cl.⁶ .................................................. H01J 5/16
[52] U.S. Cl. .................... 250/227.14; 250/231.1; 250/214.1; 367/151
[58] Field of Search .................... 250/227.14, 231.1, 250/214.1; 356/345; 367/151, 175–176, 149, 191; 128/653.1, 660.01

[56] References Cited

U.S. PATENT DOCUMENTS 3,744,017  7/1973  Dale ........................................ 367/173
4,268,912  5/1981  Congdon ................................. 367/174

Primary Examiner—Que Le
Attorney, Agent, or Firm—Benman & Collins

[57] ABSTRACT

A high sensitivity, high frequency directional hydrophone is disclosed which utilizes flexible optical waveguide wrapped about an hemispherical mandrel located at the focus of a paraboloidal acoustic reflector.

13 Claims, 1 Drawing Sheet

ULTRASONIC DIRECTIONAL FIBER-OPTIC HYDROPHONE

BACKGROUND OF THE INVENTION

1. Field of the Invention

The present invention relates to medical equipment. More specifically, the present invention relates to directional ultrasonic detection equipment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of Related Art

Ultrasonic waves have been used to flex thin metal diaphragms to which single-mode fiber-optical waveguides have been fixed. (See U.S. Pat. No. 4,959,539, issued Sep. 25, 1990 to Thomas J. Hofler et al. and entitled FLEXURAL DISK FIBER OPTIC HYDROPHONE; U.S. Pat. No. 4,951,271, issued Aug. 21, 1990, to Steven L. Garrett et al., and entitled FLEXTENSIONAL HYDROPHONE and U.S. Pat. No. 4,893,930 issued Jan. 16, 1990 to Steven L. Garrett et al. and entitled MULTIPLE AXIS, FIBER OPTIC INTERFEROMETRIC SEISMIC SENSOR the teachings of all of which are incorporated herein by reference.) These important teachings showed that high sensitivity could be achieved by using fiber waveguides as legs of an interferometer. As the diaphragm flexed, the fiber was alternately stretched and compressed on alternate locations on the diaphragm. The mass of the diaphragm is so large that the resonant frequency is around 5 kHz so these hydrophones are designed for low frequency use. Above the resonant frequency, their sensitivity declines asymptotically as $\sim p/W^2$ where p is the acoustic pressure and W is the angular frequency of the acoustic wave. (D. L. Gardner, T. Hofler, S. R. Baker, R. K. Yarbar, S. L. Garrett "A Fiber-Optic Interferometric Seismometer" J. Lightwave Tech. LT-5, #7, Eq. (3) (7/87). This means that such hydrophones are not appropriate for the ultrasonic frequencies used for medical and industrial process diagnostics.

A hydrophone using direct acoustic compression/expansion of a fiber-optic waveguide in a reflected ultrasonic wave has been described but not separately claimed. See U.S. Pat. No. 5,402,786, issued Apr. 4, 1995, to J. E. Drummond and entitled MAGNETO-ACOUSTIC RESONANCE IMAGING the teachings of which are incorporated herein by reference. This teaching described a device using a bundle of fibers wrapped around a small hemispherical mandrel. The resonant frequency of this device is determined by equality of the bundle thickness with the sonic half wavelength in the fiberglass. This much higher frequency resonance postpones asymptotic fall-off to much higher frequencies. The sensitivity computed for this hydrophone is 7.8 mrad/pascal at 850 kHz versus 10 μrad/pascal for the diaphragm hydrophone, (extrapolated sensitivity from low frequency data of S. L. Garrett, D. A. Brown, B. L. Beaton, K. Wetterskog, J. Serocki "A General Purpose Fiber-Optic Hydrophone Made of Castable Epoxy" SPIE 1367 Fiber Optic and Laser Sensors VIII p. (1990)).

Subsequent experimental work with the direct action hydrophone revealed two problems limiting its effectiveness, it proved difficult to wind more than about fifty meters of fiber on the hemispherical mandrel (because of extra cladding on commercially available fibers and delicacy of the fibers to breakage) and the acoustic reflector described was of not very effective. Thus, a need remains in the art for a hydrophone design which addresses the shortcomings in the prior art.

SUMMARY OF INVENTION

In order to increase sensitivity and directional discrimination, a sensing element consisting of optical fibers wound around a hemispherical mandrel is located at the focus of a paraboloidal ultrasound reflector. Infra-red (IR) light is sent through the fibers; the return light is interferometrically compared with light sent through an equal length of fiber unexposed to ultrasound The reflector concentrates the ultrasonic waves onto the sensing element. This produces alternating pressure on the optical fiber, shortening and lengthening the optical path. The combined light from the sensing and comparison paths is directed into a IR-sensitive diode. The radio-frequency (RF) component of current through this diode is the output signal of the system; the direction of the axis of the paraboloidal reflector for which maximum signal strength occurs is the directional bearing of the ultrasonic signal being received.

DESCRIPTION OF THE INVENTION

Figure 1:
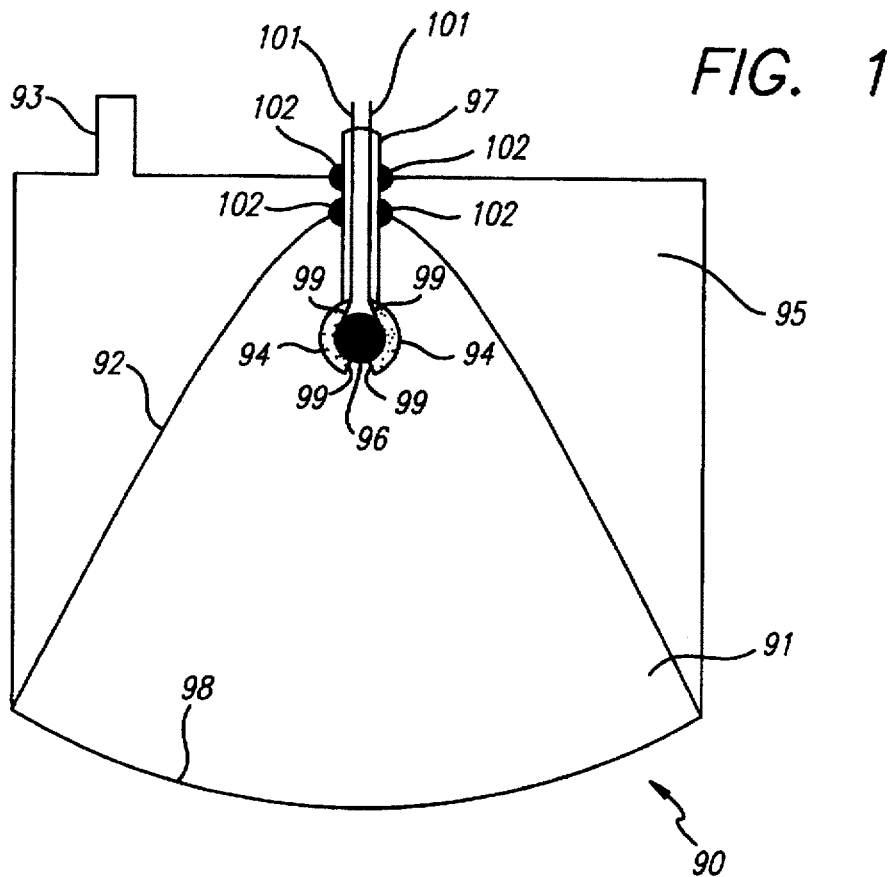
FIG. 1 shows an embodiment of the directional ultrasonic hydrophone of the present invention.

A concentrating hydrophone constructed in accordance with the teachings of the present invention is illustrated at 90 in FIG. 1 which shows a thin window, 98 which passes ultrasonic waves from an exterior liquid volume into a forward volume, 91. Of all the sound waves emitted from regions of the exterior volume, only waves from one region are focused by the reflector 92 onto the sensor, 94. The forward interior, 91, of the hydrophone 90 is preferably filled with water to conduct ultrasonic waves with little change in acoustic impedance or speed from those parameters within the exterior volume being scanned. The reflector, 92, as shown in FIG. 1, is a thin water-tight material preferably formed as a parabola of revolution. The anterior volume, 95, is filled through tube 93 with a gas such as air to a pressure equal to that of the water in which the hydrophone is submerged. Experiment has shown that a water-air interface is a far more effective sound reflector than is a water-metal interface. Thus it is the paraboloidal gas boundary which forms the reflecting surface of this device since the acoustic impedance of the gas differs by more than three orders of magnitude from that of water. The acoustic pressure intensification factor produced by the reflection is approximately equal to the ratio of the latis rectum of the reflector divided by the diameter of the sensor bundle 94. For a diameter ratio of 10:1, the pressure intensification factor is 10:1; power intensification is 20 db. The shape of the reflector not only concentrates the ultrasonic waves, but maintains the phase relations so that waves from the axial direction of the parabola arrive in phase at the focus of the parabola. Waves from other directions arrive little concentrated and out of phase with one another and so do not contribute significantly to a coherent acoustic pressure on the exposed surface of the sensor. The other surface of the sensor is bonded to the small solid spherical mandrel, 96.

This sphere is supported by strut, 97, which carries ends 101 of the optical fiber from sensor 94 as shown. As mentioned, an interface between condensed phase materials reflects little of the acoustic energy incident upon it. Rather, mandrel 96 transmits the spherical wave incident upon it from the glass from one side to the other. The mandrel material (such as aluminum) is chosen to have a high acoustic velocity so that the wave moves across the spherical core with little phase change; thus it appears as if reflected from the interface. The sensor shell 94 is preferably less than half an acoustic wavelength thick so that all parts of it experience the same phase of the pressure oscillations. The sensor 94 is made up of glass, single mode optical waveguide wound over the outer edges on the spherical core, preferably of about 0.7 cm diameter to minimize optical radiation losses due to curvature. With its cladding, the optical guide diameter is about 135 µm. The ends of this waveguide 101 are led out of the spherical shell of the sensor and through the strut 97 which passes through water-tight ports, 102. Outside of the hydrophone housing 90, the fibers are led to a fiber interferometer shown in FIG. 2.

Figure 2:
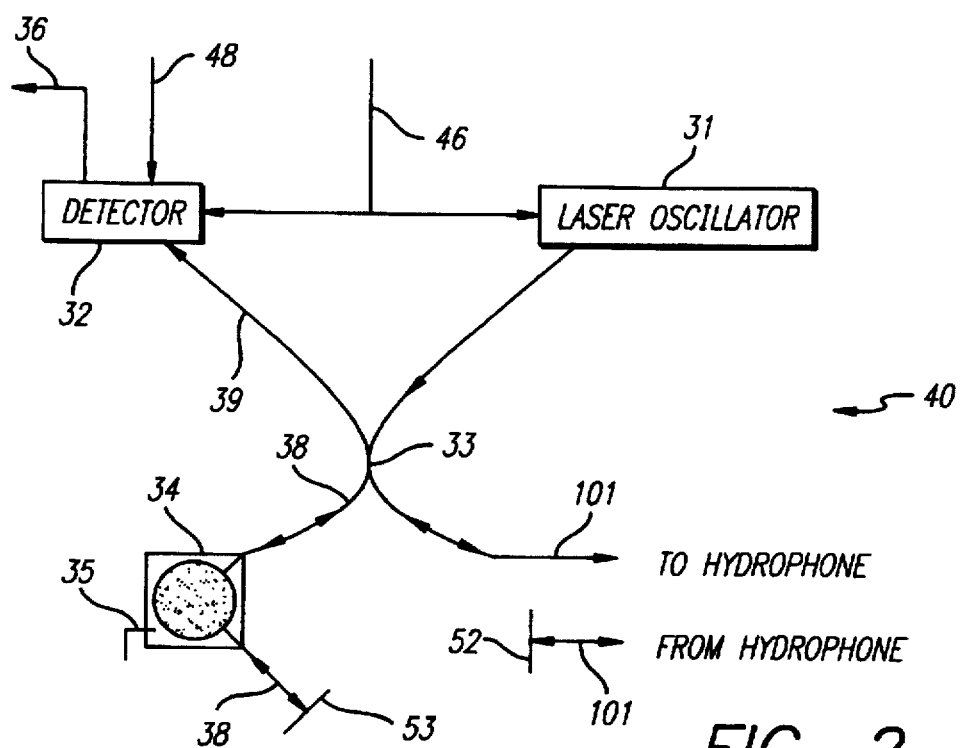
FIG. 2 shows a Michelson-type interferometric embodiment of the electro-optical coupling system of the present invention.

FIG. 2 shows an Michelson-type embodiment of the electro-optical (EO) coupler. Electrical input line 46 carries a gating signal to laser 31 and photodetector 32. This signal is derived from whatever process is under observation to prevent operation of the hydrophone system when undesired acoustic signals and noise are present but the desired signal is not present. By cutting off the laser during such periods, undesirable heating of optical and other components is prevented. This will allow higher power laser operation when it is desired for greater system sensitivity. Cutting off the detector as keeps noise and unwanted signals from disturbing the detector and its associated electronics. This can be used to prevent damage to the circuitry due to very large signals thus allowing the detector to be as sensitive as possible. Unwanted signals and noise are also thus kept out of any subsequent signal processing circuits.

When laser oscillator 31 is pulsed on, its output light is directed to the 3 dB fiber coupler 33 and from that into fiber waveguides 38 and 101. The light is preferably of a wavelength transmitted with low absorption through the optical fibers, e.g. 1.3 µm wavelength infra-red (IR). The light passing through the hydrophone and emerging from the other end of fiber 101 is reflected from mirror 52 so that it returns for a second pass through the sensitive region of the hydrophone. The alternating compression and rarefaction of that portion of light guide 101 caused by the ultrasonic waves incident on it shortens and lengthens the optical path. The return signal, melded with the return signal from comparison device 34, produces interference alternating with its changing phase. These two signals are of equal amplitude since the device 35 is preferably the same as the hydrophone 90 in so far as the optical path is concerned but without exposure to the acoustic signal. The IR light passing through comparison device 34 is reflected from mirror 53 back along fiber 38. Reference device 34 is fitted with vernier control 35 which adjusts the pressure experienced by fiber 38 within device 34 to optimize the relative phase of the its return IR signal. At optimum, the return signals in light guides entering coupler 33 are in phase quadrature with respect to one another. The amplitude modulated light wave resulting from the interference of these two signals is directed through light guide 39 to photoelectric detector 32. The detector is not only gated by the signal on line 46, but its gain is controlled by line 48. This allows compensation for acoustic signals which arise from different distances from the hydrophone. The electrical output of the detection system is from line 36. Laser 31 is also subject to half of the interference light. This could destabilize the laser but for the radiation which occurs from the bends in fibers 38 and 101. Measurements have shown that the return signal from the hydrophone is almost 10 dB less than that sent into it. This is enough loss to avoid destabilization of the laser.

Other interferometer configurations can be used. The Michelson form handles the radiation loss well by providing the same loss along its two arms. The Fabry-Perot type does less well because in each round trip, the light is so attenuated that the many reflections which normally increase sensitivity of this type interferometer do not occur.

What is claimed is:

1. A directional hydrophone comprising:

a reflector and sensor means disposed within said reflector for detecting acoustic waves and providing an optical signal in response thereto, said sensor comprising a first optical fiber wound into a volume.

2. The invention of claim 1 wherein said reflector is a paraboloid.

3. The invention of claim 2 wherein said sensor means is disposed at a focus point of said reflector.

4. The invention of claim 3 wherein said reflector comprises a gas to liquid interface.

5. The invention of claim 3 wherein said reflector comprises a liquid to gas interface.

6. The invention of claim 1 wherein said reflector is disposed in a housing.

7. The invention of claim 1 wherein said optical fiber is wound into a semi-spherical volume.

8. The invention of claim 7 wherein said semi-spherical volume is a ball.

9. The invention of claim 8 wherein said ball is wound around a mandrel.

10. The invention of claim 1 further including means for detecting said optical signal.

11. The invention of claim 10 wherein said means for detecting said optical signal is a Michelson interferometer.

12. The invention of claim 11 wherein said interferometer includes a second optical fiber wound into a volume in a comparison leg thereof.

13. The invention of claim 12 wherein said second optical fiber is wound into the same shape as the first optical fiber.

* * * * *